United States Patent [19]

Nakamura et al.

[11] 4,278,575

[45] Jul. 14, 1981

[54] MODIFIED ACRYLIC COPOLYMER AND COATING COMPOSITION COMPRISING SUCH COPOLYMER

[75] Inventors: Hidehisa Nakamura; Ryoichi Hori, both of Sakai; Emiko Isomoto, Kishiwada; Yoichi Murakami, Osaka, all of Japan

[73] Assignee: Dainippon Ink & Chemicals, Inc., Japan

[21] Appl. No.: 101,109

[22] PCT Filed: Oct. 26, 1978

[86] PCT No: PCT/JP78/00013

§ 371 Date: Jun. 28, 1979

§ 102 (e) Date: Jun. 19, 1979

[87] PCT Pub. No: WO79/00240

PCT Pub. Date: May 3, 1979

[30] Foreign Application Priority Data

Oct. 28, 1977 [JP] Japan .................. 52-128720

[51] Int. Cl.$^3$ .................. C09D 3/68; C09D 3/81
[52] U.S. Cl. .................. 260/22 CB; 260/23 P; 260/23 AR; 525/36; 525/43; 525/46; 525/48; 526/75; 526/79
[58] Field of Search ............ 260/23 P, 22 CB, 23 AR; 526/75, 79; 525/36, 43, 46, 48

[56] References Cited

U.S. PATENT DOCUMENTS

| | | | |
|---|---|---|---|
| 2,550,114 | 4/1951 | Foster | 260/23 P |
| 2,559,466 | 7/1951 | Root | 260/23 P |
| 3,455,858 | 7/1969 | Taft | 260/22 CB |
| 3,463,749 | 8/1969 | Taft | 260/23 P |
| 3,721,722 | 3/1973 | Baum | 525/36 |
| 3,847,851 | 11/1974 | Tugukuni et al. | 260/23 P |
| 4,066,586 | 1/1978 | Tanuma et al. | 260/23 P |
| 4,116,903 | 9/1978 | Lietz et al. | 260/23 P |

FOREIGN PATENT DOCUMENTS 42-4359 2/1967 Japan .

*Primary Examiner*—Ronald W. Griffin
*Attorney, Agent, or Firm*—Wenderoth, Lind & Ponack

[57] ABSTRACT

It has previously been known that the poor pigment dispersibility of an acrylic paint is its defect. The present invention provides a modified acrylic copolymer having superior pigment dispersibility and being suitable as a vehicle for acrylic paints. The copolymer is obtained by polymerizing specified proportions of a polyester containing an unsaturated double bond, a dialkylaminoalkyl (meth)acrylate, methyl methacrylate and another polymerizable monomer, and has a weight average molecular weight/number average molecular weight ratio within the range of 3 to 20.

6 Claims, No Drawings

MODIFIED ACRYLIC COPOLYMER AND COATING COMPOSITION COMPRISING SUCH COPOLYMER

TECHNICAL FIELD

This invention relates to a modified acrylic copolymer having superior pigment dispersibility, a process for its production, and to the use of the copolymer as a paint vehicle.

BACKGROUND TECHNOLOGY

Acrylic paints for use as colored paints are not highly valued because their pigment dispersibility is unsatisfactory despite the good properties of films prepared therefrom. Attempts have been made to overcome this disadvantage by adding pigment dispersion improvers such as certain surface-active agents, silicone compounds and organic carboxylic acid metal salts during paint manufacture. The extent of improvement achieved, however, is remote from the desired level.

It is an object of this invention therefore to provide a resin or polymer suitable for acrylic paints which has superior pigment dispersibility and superior coated film properties such as hardness, weatherability, corrosion resistance, color retention and soiling resistance.

DISCLOSURE OF THE INVENTION

It has now been found that the desired polymer can be obtained by using certain proportions of a polyester containing an unsaturated double bond and a dialkylaminoalkyl (meth)acrylate as comonomers in the polymerization of an acrylic monomer and by adjusting the ratio of the weight average molecular weight of the product to its number average molecular weight to from 3 to 20.

Accordingly, the present invention provides a modified acrylic copolymer having a weight average molecular weight/number average molecular weight ratio within the range of from 3 to 20, said copolymer being obtained by polymerizing 1 to 40% by weight of a polyester containing an unsaturated double bond, 0.05 to 10% by weight of a dialkylaminoalkyl (meth)acrylate, 10 to 83.95% by weight of methyl methacrylate and 15 to 78.95% by weight of another polymerizable monomer.

The modified copolymer in accordance with this invention has superior pigment dispersibility without adding a pigment dispersion improver. This modified copolymer also has superior film hardness, weatherability, corrosion resistance, color retention and soiling resistance which are the characteristics of conventional acrylic paints.

The dialkylaminoalkyl (meth)acrylate, one component constituting the modified copolymer, contains 1 to 8 carbon atoms in the alkyl moiety. Examples of the (meth)acrylate are dimethylaminoethyl acrylate, dimethylaminoethyl methacrylate, diethylaminoethyl acrylate, and diethylaminoethyl methacrylate. The amount of the dialkylaminoalkyl (meth)acrylate used is 0.05 to 10% by weight, preferably 0.1 to 5% by weight, based on the sum of the starting materials for the modified copolymer. When the amount is less than 0.05% by weight, a modified copolymer having good pigment dispersibility cannot be obtained. On the other hand, when the amount exceeds 10% by weight, a modified copolymer having superior weatherability (resistance to yellowing) cannot be obtained.

Preferably, the polyester containing an unsaturated double bond, another component constituting the modified copolymer, is (1) a drying oil and/or semi-drying oil alkyd resin having a number average molecular weight of 500 to 10,000 and an oil length of 30 to 80%, or (2) an unsaturated oil-free alkyd resin having a hydroxyl equivalent weight of 300 to 600. Starting materials for such polyesters include polyhydric, preferably dihydric to pentahydric alcohols, saturated dicarboxylic acids, the anhydrides thereof or the lower alkyl esters thereof (which may optionally be mixed with saturated monocarboxylic acids), drying oil or semi-drying oils [only in the case of (1) above], and unsaturated dicarboxylic acids or the anhydrides thereof [only in the case of (2) above].

Examples of such polyhydric alcohols are mono-, di-, tri- or tetra-ethylene glycol, mono-, di- or tri-propylene glycol, neopentyl glycol, 1,6-hexanediol, 1,3-butylene glycol, 1,4-butylene glycol, bis(hydroxyethyl) terephthalate, hydrogenated bisphenol A, trimethylol ethane, trimethylolpropane, glycerol, and pentaerythritol.

Examples of the dicarboxylic acids and monocarboxylic acids are phthalic acid, isophthalic acid, terephthalic acid, Het Acid, trimellitic acid, succinic acid, oxalic acid, adipic acid, sebacic acid, benzoic acid, p-tert.-butylbenzoic acid and p-hydroxybenzoic acid.

Examples of the drying oils and semi-drying oils are linseed oil, tung oil, safflower oil, dehydrated castor oil, cottonseed oil, soybean oil, and rice bran oil. Instead of such oils, the fatty acids of these oils and Tall oil fatty acids may be used.

Examples of the unsaturated dicarboxylic acids are maleic acid, fumaric acid, itaconic acid, citraconic acid, and tetrahydrophthalic anhydride.

To obtain the polyester containing an unsaturated double bond (for convenience, this will sometimes be referred to as a polyester in the following description), a mixture of ingredients propertly selected from the above-exemplified materials is polymerized by a known method. However, for the production of the modified copolymer of this invention, the degree of unsaturation of the polyester should be within a certain range. Accordingly, where the drying oil and/or semidrying oil alkyd resin (1) is to be obtained, such an oil should be used in an amount of 30 to 80% by weight based on the sum of the starting materials. When the unsaturated oil-free alkyd resin (2) is to be obtained, the unsaturated dicarboxylic acid should be used in an amount of 0.5 to 5% by weight based on the sum of the starting materials.

The degree of unsaturation of the polyester should be made high when it is desired to increase the molecular weight of the modified copolymer.

The polyester is used in an amount of 1 to 40% by weight based on the sum of the starting materials for the modified copolymer. When the amount of the polyester is less than 1% by weight, a modified copolymer having good pigment dispersibility cannot be obtained. On the other hand, when the amount of the polyester is more than 40% by weight, a modified copolymer having good coated film hardness and soiling resistance cannot be obtained.

Methyl methacrylate, still another component constituting the modified copolymer, is used in an amount of 10 to 83.95% by weight based on the sum of the starting materials for the modified copolymer. When the amount of methyl methacrylate is less than 10% by weight, modified copolymer having good weatherability cannot be obtained. When the amount is more than 83.95% by weight, a modified copolymer having good coated film hardness cannot be obtained.

Examples of the "other polymerizable monomer", still another component constituting the modified copolymer, include styrenes such as styrene, vinyltoluene and α-methylstyrene; acrylic esters and methacrylic esters other than methyl acrylate, in which the alcohol moiety has 1 to 12 carbon atoms, such as methyl acrylate, ethyl acrylate, propyl acrylate, isopropyl acrylate, butyl acrylate, isobutyl acrylate, tert.-butyl acrylate, n-octyl acrylate, 2-ethylhexyl acrylate, lauryl acrylate, stearyl acrylate, ethyl methacrylate, isopropyl acrylate, butyl acrylate, isobutyl methacrylate, tert.-butyl methacrylate, n-octyl methacrylate, 2-ethylhexyl methacrylate, lauryl methacrylate and stearyl methacrylate; vinyl esters such as vinyl acetate, vinyl propionate and vinyl versatate; and aliphatic unsaturated nitriles such as acrylonitrile, α-chloroacrylonitrile and methacrylonitrile. In addition to these monomers free from a functional group such as a carboxyl or hydroxyl group, the "other polymerizable monomers" which can be used in this invention include monomers containing functional groups, for example hydroxylalkyl esters of (meth)acrylic acid such as β-hydroxyethyl acrylate, β-hydroxyethyl methacrylate, β-hydroxypropyl acrylate, β-hydroxypropyl methacrylate, 4-hydroxybutyl acrylate and 4-hydroxybutyl methacrylate; (meth)acrylamides such as N-methylolacrylamide, N-methylol methacrylamide, N-butoxymethyl acrylamide and N-butoxymethyl methacrylamide; and glycidyl esters of (meth)acrylic acid such as glycidyl acrylate, glycidyl methacrylate, methylglycidyl acrylate and methylglycidyl methacrylate.

The polymerizable monomer is used in an amount of 15 to 78.95% by weight based on the sum of the starting materials for the modified copolymer. Modified copolymers produced by using the polymerizable monomer in amounts outside this range have poor coatability, gloss, flexibility, film hardness, weatherability, drying property and solvent resistance.

The modified copolymer in accordance with this invention is obtained by performing the radical polymerization of a monomeric mixture containing 1 to 40% by weight of the polyester containing an unsaturated double bond, 0.05 to 10% by weight of the dialkylaminoalkyl (meth)acrylate, 10 to 83.95% by weight of methyl methacrylate and 15 to 78.95% by weight of the other polymerizable monomer in the presence or absence of a solvent in such a manner that the ratio of the weight average molecular weight to its number average molecular weight becomes 3 to 20.

The radical polymerization is carried out by a method known per se. The suitable polymerization temperature is 70° to 130° C.

Suitable polymerization initiators include azobisisobutyronitrile, benzoyl peroxide, t-butyl perbenzoate, t-butyl hydroperoxide, di-t-butyl peroxide, and cumene hydroperoxide. The polymerization initiator is used in an amount of 0.01 to 5% based on the monomeric mixture. Suitable solvents include aromatic compounds such as toluene and xylene, esters such as ethyl acetate, butyl acetate and Cellosolve acetate, ketones such as methyl isobutyl ketone and methyl ethyl ketone, and alcohols such as butanol, isobutanol and butyl Cellosolve, which are used either singly or as mixtures.

Modified copolymers having a ratio of weight average molecular weight (to be referred to as $\overline{M}w$ in the following description) to number average molecular weight (to be referred to as $\overline{M}n$ in the following description), $\overline{M}w/\overline{M}n$, of from 3 to 20 have a broad molecular weight distribution. It is difficult to produce a modified copolymer having an $\overline{M}w/\overline{M}n$ ratio of 3 to 20 in one step. In a preferred embodiment of this invention, therefore, a part of the monomeric mixture is polymerized in a first step to produce a polymer having a relatively high molecular weight, and in a second step, the remainder of the monomeric mixture is added and polymerized to form a polymer having a relatively low molecular weight. As a result, the desired modified copolymer is obtained. The $\overline{M}w/\overline{M}n$ of the modified copolymer depends upon the amount and molecular weight of the product in the first step and the amount and molecular weight of the product of the second step. Those skilled in the art well know a method for producing polymers having the desired molecular weight. Generally, for a polymer having a higher molecular weight, a lesser amount of polymerization initiator, a higher monomer concentration and a lower temperature are used. Opposite conditions are used to obtain polymers having lower molecular weights.

POSSIBILITY OF UTILIZATION IN INDUSTRY

The modified copolymers of this invention as such are very suitable as paint vehicles.

The modified copolymers of this invention may also be used as lacquer-type paints in the form of mixtures with vinyl resins, alkyd resins, nitrocellulose, etc.

When the modified copolymers of this invention contain functional groups such as a carboxyl or hydroxyl group, they may be used as curable paints in the form of mixtures with curing agents such as polyisocyanates, amino resins and epoxy resins.

If desired, pigments, dyes, levelling agents, thixotropic agents, curing promoters, etc. may be incorporated.

The modified copolymers of this invention are especially advantageous when used as vehicles for colored paints.

The resulting paint can be coated by an ordinary coating method such as spray coating, brush coating or roller coating. The method of drying that can be used includes room temperature drying, forced drying, bake drying, far infrared drying, etc. depending upon the composition of the modified copolymer.

BEST MODE FOR PRACTICING THE INVENTION

The following Examples, Referential Examples, Comparative Examples and Application Examples illustrate the present invention specifically. However, the present invention is not limited to the description of these examples. All percentages and parts in these examples are on a weight basis.

REFERENTIAL EXAMPLE A (Production of a Polyester Containing an Unsaturated Double Bond)

A reactor equipped with a stirrer, a thermometer, an air condenser and a nitrogen inlet tube was charged with 500 parts of linseed oil, 105.8 parts of glycerol and 0.125 part of litharge, and ester interchange was performed at 240° C. for 1 hour. The reaction mixture was cooled to 200° C., and 82.4 parts of glycerol and 364.1 parts of phthalic anhydride were added. The reaction was performed at 230° C. for 10 hours in a stream of nitrogen.

The product was diluted with toluene to an involatile content of 50% to afford a solution of a linseed alkyd resin solution having a Gardner viscosity of B-C, an acid value of 3.6, a number average molecular weight of 8,800 and an oil length of 50%.

REFERENTIAL EXAMPLE B (Production of a Polyester Containing an Unsaturated Double Bond)

A reactor equipped with a stirrer, a thermometer, an air condenser and a nitrogen inlet tube was charged with 440 parts of isophthalic acid, 177.5 parts of adipic acid, 361 parts of neopentyl glycol, 181.3 parts of trimethylolpropane and 15 parts of maleic anhydride, and they were reacted in a nitrogen stream at 220° C. for about 10 hours to afford a resin having an acid value of 8, a hydroxyl value of 132, a hydroxyl equivalent weight of 425 and a number average molecular weight of 1,600. The product was diluted with a mixed solvent of toluene and butyl acetate (50:50 by weight) to an involatile content of 60% to afford a resin solution having a Gardner viscosity of H, an acid number of 4.8, a hydroxyl value of 79.2 and a color number of 2.

EXAMPLE 1

A monomeric mixture (950 parts) consisting of 530 parts of methyl methacrylate, 300 parts of ethyl acrylate, 100 parts of β-hydroxyethyl methacrylate and 20 parts of diethylaminoethyl methacrylate was prepared. A reactor equipped with a stirrer, a thermometer, a condenser and a nitrogen gas inlet tube was charged with 100 parts of the alkyl resin obtained in Referential Example A, 130 parts of toluene, 150 parts of butyl acetate, 400 parts of the above-prepared monomeric mixture and 2 parts of benzoyl peroxide. The temperature was raised to 110° C., and the mixture was maintained at 110° C. for 1 hour, followed by adding 470 parts of toluene. The temperature was again raised to 110° C., and a mixture consisting of 550 parts of the remainder of the monomeric mixture, 200 parts of toluene and 20 parts of benzoyl peroxide was added dropwise at 110° C. over the course of 3 hours. After the addition, the mixture was maintained for 8 hours to afford a solution of a modified copolymer having an involatile content of 50.8%, a Gardner viscosity of Y-Z, $\overline{M}n$ of 13,000 and $\overline{M}w/\overline{M}n$ of 8.4.

EXAMPLE 2

A monomeric mixture (900 parts) consisting of 300 parts of styrene, 280 parts of methyl methacrylate, 100 parts of β-hydroxyethyl methacrylate, 200 parts of butyl acrylate and 20 parts of diethylaminoethyl methacrylate was prepared.

In the same way as in Example 1, a reactor was charged with 167 parts of the oil-free alkyd resin of Referential Example B, 400 parts of the monomeric mixture, 96 parts of butyl acetate, 167 parts of toluene and 2 parts of benzoyl peroxide. The temperature was raised to 110° C., and the mixture was maintained at 110° C. for 1 hour. Then, 100 parts of toluene and 370 parts of butyl acetate were added. The temperature was again raised to 110° C., and a mixture consisting of 500 parts of the remaining monomeric mixture, 200 parts of toluene and 20 parts of BPO was added dropwise at 110° C. over the course of 3 hours. After the addition, the mixture was maintained at 110° C. for 10 hours to afford a modified polymer solution having an involatile content of 49.9%, a viscosity Gardner of T-U, $\overline{M}n$ of 11,000 and $\overline{M}w/\overline{M}n$ of 9.5.

COMPARATIVE EXAMPLE 1

A modified copolymer solution having an involatile content of 50.1%, a Gardner viscosity of X-Y, $\overline{M}n$ of 11,000 and $\overline{M}w/\overline{M}n$ of 8.1 was produced in the same way as in Example 1 except that methyl methacrylate was used instead of 20 parts of diethylaminoethyl methacrylate used in Example 1.

COMPARATIVE EXAMPLE 2

A modified copolymer solution having an involatile content of 50.3%, a Gardner viscosity of R-S, $\overline{M}n$ of 10,000 and $\overline{M}w/\overline{M}n$ of 9.4 was produced in the same way as in Example 2 except methyl methacrylate was used instead of 20 parts of diethylaminoethyl methacrylate used in Example 2.

COMPARATIVE EXAMPLE 3

A monomeric mixture (1,000 parts) consisting of 580 parts of methyl methacrylate, 100 parts of β-hydroxyethyl methacrylate, 300 parts of ethyl acrylate and 20 parts of diethylaminoethyl methacrylate was prepared. In the same way as in Example 1 a reactor was charged with 330 parts of toluene, 400 parts of the above monomeric mixture and 2 parts of benzoyl peroxide. The temperature was raised to 110° C., and the mixture was maintained at 110° C. for 1 hour, followed by adding 470 parts of toluene. The temperature was again raised to 110° C., and a mixture consisting of 600 parts of the remaining monomeric mixture, 200 parts of toluene and 20 parts of benzoyl peroxide was added dropwise at 110° C. over the course of 3 hours. After the addition, the mixture was maintained at 110° C. for 8 hours to afford a modified copolymer solution having an involatile content of 50.5%, a Gardner viscosity of Z, $\overline{M}n$ of 14,000 and $\overline{M}w/\overline{M}n$ of 4.0.

COMPARATIVE EXAMPLE 4

A modified copolymer solution having an involatile content of 50.6%, a Gardner viscosity of Y-Z, $\overline{M}n$ of 12,500 and $\overline{M}w/\overline{M}n$ of 4.3 was produced in the same way as in Comparative Example 3 except that methyl methacrylate was used instead of the diethylaminoethyl methacrylate used in Comparative Example 3.

EXAMPLE 3

A monomeric mixture (960 parts) was prepared by mixing 690 parts of methyl methacrylate, 250 parts of butyl acrylate and 20 parts of diethylaminoethyl methacrylate.

The same reactor as used in Example 1 was charged with 80 parts of the alkyd resin of Referential Example A, 290 parts of toluene, 400 parts of the above monomeric mixture and 2 parts of benzoyl peroxide. They were heated to 110° C., and maintained at 110° C. for 1 hour. Toluene (470 parts) was added, and the mixture was heated again to 110° C. A mixture consisting of 560 parts of the remaining monomeric mixture, 200 parts of toluene and 12 parts of benzoyl peroxide was added dropwise at 110° C. over the course of 3 hours. The reaction mixture was maintained at 110° C. for 8 hours to afford a modified copolymer solution having an involatile content of 50.1%, a Gardner viscosity of Z-Z$_1$, $\overline{M}n$ of 18,000 and $\overline{M}w/\overline{M}n$ of 7.2.

A lacquer-type paint was prepared by mixing 100 parts of the resulting modified copolymer solution, 50 parts of a 20% solution of cellulose acetate butyrate (dissolved in a mixed solvent consisting of 50 parts of toluene, 30 parts of butyl acetate and 20 parts of methyl ethyl ketone), 5 parts of dibutyl phthalate and 65 parts of rutile-type titanium dioxide.

The paint was coated on a Bonderized steel sheet to a dry thickness of 30 to 40 microns, and dried at room temperature for a week. The properties of the coated film are shown in Table 3, column C.

EXAMPLE 4

A modified copolymer solution having an involatile content of 50.2%, a Gardner viscosity of X-Y, $\overline{M}n$ of 17,000 and $\overline{M}w/\overline{M}n$ of 7.3 was produced in the same way as in Example 5 except that styrene was used instead of the methyl methacrylate used in Example 5.

A lacquer-type paint was prepared by mixing 100 parts of the modified copolymer solution, 50 parts of a 20% solution of ¼" nitrocellulose (dissolved in a mixed solvent consisting of 50 parts of toluene, 25 parts of methyl ethyl ketone and 25 parts of isopropyl alcohol), 5 parts of dibutyl phthalate and 65 parts of rutile-type titanium dioxide.

The paint was coated on a Bonderized steel sheet to a dry thickness of 30 to 40 microns, and dried at room temperature for 1 week. The properties of the resulting coated film are shown in Table 3, column D.

APPLICATION EXAMPLE 1

(1) A pigment was added to 100 parts of each of the polymer solutions obtained in the above Examples and Comparative Examples so that the pigment content (PWC=the weight of the pigment/the weight of the solids content of the polymer X 100) reached the values shown in Table 1, and 40 parts of a thinner (a mixture of xylene and butyl acetate in a weight ratio of 50:50) and 50 parts of glass beads were added. They were kneaded in a sandmill for 1 to 3 hours. The glass beads were separated by filtration to obtain a color base.

The following pigments were used.
Black: carbon black
Red: quinacridone pigment
Green: phthalocyanine green pigment (2) The color base was diluted with an equal weight of a thinner, and the diluted solution was visually examined with unaided eyes for (1) sedimentation stability, (2) the presence of flocculation of the pigment, and (3) the presence of a thixotropic condition. The sedimentation stability was examined after allowing the solution to stand for one week.

(3) The color base was also diluted with a thinner to form a paint having a viscosity, measured by means of a Ford cup No. 4, of 18 to 20 seconds. The paint was coated on a tin plate, and allowed to stand at room temperature for one day. Then, the gloss of the coated film was examined.

The results are shown in Table 1.

(4) A color base with a PWC of 40% was prepared in the same way as in (1) above using a white pigment (rutile-type titanium dioxide). The color base was mixed with white, red, black and green (the weight ratio of white:red:black:green=100:5:5:5). In the same way as in (2) and (3), (1) sedimentation stability, (2) color difference ($\Delta E$) between spray coating and flow coating, and (3) gloss were examined.

The results are shown in Table 2.

TABLE 1

| | | | Dispersibility of colors | | | |
|---|---|---|---|---|---|---|
| Sample | Pigment | PWC (%) | Sedimentation stability | Presence of flocculation of pigment | Presence of a thixotropic condition | Gloss |
| Example 1 | Black | 10 | ◎ | ◎ | No | ◎ |
| | Red | 20 | ◎ | ◎ | No | ◎ |
| | Green | 20 | ◎ | ◎ | No | ◎ |
| Example 2 | Black | 10 | ◎ | ◎ | No | ◎ |
| | Red | 20 | ◎ | ◎ | No | ◎ |
| | Green | 20 | ◎ | ◎ | No | ◎ |
| Example 3 | Black | 10 | ◎ | ◎ | No | ◎ |
| | Red | 20 | ◎ | ◎ | No | ◎ |
| | Green | 20 | ◎ | ◎ | No | ◎ |
| Example 4 | Black | 10 | ◎ | ◎ | No | ◎ |
| | Red | 20 | ◎ | ◎ | No | ◎ |
| | Green | 20 | ◎ | ◎ | No | ◎ |
| Comparative Example 1 | Black | 10 | ◎ | O | No | Δ |
| | Red | 20 | ◎ | Δ | Yes | Δ |
| | Green | 20 | x | x | Yes | x |
| Comparative Example 2 | Black | 10 | ◎ | Δ | No | x |
| | Red | 20 | ◎ | Δ | No | Δ |
| | Green | 20 | x | x | Yes | x |
| Comparative Example 3 | Black | 10 | x | x | Yes | x |
| | Red | 20 | x | x | Yes | x |
| | Green | 20 | x | x | Yes | x |
| Comparative Example 4 | Black | 10 | x | x | Yes | x |
| | Red | 20 | x | x | Yes | x |
| | Green | 20 | x | x | Yes | x |

◎: excellent;
O good;
Δ slightly poor;
x poor

TABLE 2

| | Dispersibility of a four color mixture | | |
|---|---|---|---|
| Sample | Sedimentation stability | Color difference ($\Delta E$) between spray coating and flow coating | Gloss |
| Example 1 | ◎ | 0.3 | ◎ |
| 2 | ◎ | 0.3 | ◎ |
| 3 | ◎ | 0.3 | ◎ |
| 4 | ◎ | 0.3 | ◎ |
| Comparative Example 1 | Δ | 2.5 | O |
| 2 | Δ | 3.5 | O |
| 3 | x | 7.5 | Δ |
| 4 | x | 7.6 | Δ |

◎: excellent;
O good;
Δ slightly poor;
x poor

APPLICATION EXAMPLE 2

Sixty parts of rutile-type titanium dioxide was dispersed in 100 parts of each of the polymer solutions obtained in Example 1 and Comparative Examples 1, 3 and 4 and then 13.5 parts of a trimethylolpropane-tolylene diisocyanate adduct (75% ethyl acetate solution) as a curing agent was added. The resulting enamel was coated on a Bonderized steel sheet to a dry thickness of 30 to 40 microns, and baked at 120° C. for 3 minutes. The properties of the resulting coated film are shown in Table 3, box A.

APPLICATION EXAMPLE 3

Butoxymethylmelamine (30 parts) having an involatile content of 50% as a curing agent and 50 parts of rutile-type titanium dioxide were mixed with 70 parts of each of the polymer solutions obtained in Example 2 and Comparative Example 2. The resulting enamel was coated on a Bonderized steel sheet to a dry thickness of 30 to 40 microns, and baked at 150° C. for 20 minutes. The properties of the resulting coated films are shown in Table 3, box B.

The methods for measurement of the various properties shown in Table 3 were as follows:
(1) Pencil hardness (JIS K5400; 6.14)
(2) Erichsen (DIN-53156)
(3) Impact resistance (JIS K5400; 6.13.3)
(4) Adhesiveness (peeling of an adhesive cellophane tape)

The coated film on a substrate is cut lengthwise and widthwise at intervals of about 1 mm using a record playing stylus to provide 100 square sections each having an area of 1 mm². An adhesive cellophane tape is applied fully to the coated film so as to cover these square sections completely. Instantaneously, the tape is peeled off quickly with force, and the number of square sections which remain adhering completely to the substrate is counted. The "adhesiveness" is expressed by a common fraction having the counted number as the numerator and the total number (100) of squares as the denominator. Accordingly, "100/100" represents the best adhesiveness, and 0/100 represents the worst adhesiveness.

TABLE 3

| Box | Polymer | Properties of coated film | | | |
|---|---|---|---|---|---|
| | | Pencil hardness | Erichsen | Impact resistance | Adhesiveness |
| | Example 1 | 2H | >5 mm | 40 | 100/100 |
| | Comparative Example 1 | 2H | >5 | 40 | 100/100 |
| AA | Comparative Example 3 | 2H | >5 | 40 | 100/100 |
| | Comparative Example 4 | 2H | >5 | 40 | 100/100 |
| | Example 2 | 3H | 4 | 30 | 100/100 |
| B | Comparative Example 2 | 3H | 4 | 30 | 100/100 |
| C | Example 3 | 2H | 6 | 20 | 100/100 |

TABLE 3-continued

| Box | Polymer | Properties of coated film | | | |
|---|---|---|---|---|---|
| | | Pencil hardness | Erichsen | Impact resistance | Adhesiveness |
| D | Example 4 | 2H | 6 | 20 | 100/100 |

It is seen from Tables 1 and 2 that the modified copolymers of this invention have superior pigment dispersibility. Table 3 demonstrates that the modified copolymers of this invention have mechanical characteristics comparable to those of copolymers of the prior art.

What is claimed is:

1. A coating composition comprising a mixture of vehicle, solvent and a pigment, which vehicle is a modified acrylic copolymer having a weight average molecular weight/number average molecular weight ratio within the range of from 3 to 20, said copolymer being obtained by the polymerization of 1 to 40% by weight of a polyester containing an unsaturated double bond, 0.05 to 10% by weight of a dialkylaminoalkyl (meth)acrylate, 10 to 83.95% by weight of methyl methacrylate and 15 to 78.95% by weight of another polymerizable monomer.

2. The composition of claim 1 wherein the polyester containing an unsaturated double bond is a drying oil and/or semidrying oil alkyd resin having a number average molecular weight of 500 to 10,000 and an oil length of 30 to 80%.

3. The composition of claim 1 wherein the polyester containing an unsaturated double bond is an unsaturated oil-free alkyd resin having a hydroxyl equivalent of 300 to 600, said alkyd resin containing a residue derived from 0.5 to 5% by weight, based on the sum of the starting materials for the alkyd resin, of an unsaturated dicarboxylic acid.

4. The composition of claim 1, 2 or 3 wherein the dialkylaminoalkyl (meth)acrylate contains 1 to 8 carbon atoms in the alkyl moiety.

5. The composition of claim 4 wherein the dialkylaminoalkyl (meth)acrylate is dimethylaminoethyl methacrylate or diethylaminoethyl methacrylate.

6. A modified acrylic copolymer having a weight average molecular weight/number average molecular weight ratio within the range of from 3 to 20, said copolymer being obtained by the polymerization of 1 to 40% by weight of a polyester containing an unsaturated double bond, 0.05 to 10% by weight of a dialkylaminoalkyl (meth)acrylate, 10 to 83.95% by weight of methyl methacrylate and 15 to 78.95% by weight of another polymerizable monomer.

* * * * *